_United States Patent_ [19]

Leonard

[11] 4,052,425

[45] Oct. 4, 1977

[54] FATTY ACID FEED STOCK BLEND OF RED OIL AND SOAP STOCK FOR THE PREPARATION OF DIMER FATTY ACIDS

[75] Inventor: Edward C. Leonard, Memphis, Tenn.

[73] Assignee: Kraft, Inc., Glenview, Ill.

[21] Appl. No.: 606,187

[22] Filed: Aug. 20, 1975

[51] Int. Cl.$^2$ .............................................. C11C 1/00
[52] U.S. Cl. .................................... 260/413; 260/407
[58] Field of Search .................... 260/407, 412, 412.5, 260/412.6, 413

[56] References Cited

U.S. PATENT DOCUMENTS

| | | | |
|---|---|---|---|
| 2,437,343 | 3/1948 | Barnitz | 260/407 |
| 2,955,121 | 10/1960 | Myers et al. | 260/407 |
| 3,157,681 | 11/1964 | Fischer | 260/407 |
| 3,280,140 | 10/1966 | Sharkey | 260/407 |
| 3,437,650 | 4/1969 | Rummelsburg | 260/97.5 |
| 3,595,887 | 7/1971 | Kulkarni et al. | 260/407 |
| 3,600,344 | 8/1971 | Broecker et al. | 260/407 |
| 3,632,822 | 1/1972 | Conroy | 260/407 |
| 3,755,389 | 8/1973 | Blaney | 260/419 |

FOREIGN PATENT DOCUMENTS 548,257   10/1942   United Kingdom ................. 260/407

OTHER PUBLICATIONS

"Industrial Fatty Acids and their Applications," edited by E. Scott Pattison, Reinhold Publ. Corp. (1959), pp. 6-8, 35, & 91-94.

_Primary Examiner_—Patrick P. Garvin
_Assistant Examiner_—P. E. Konopka
_Attorney, Agent, or Firm_—Fitch, Even, Tabin & Luedeka

[57] ABSTRACT

A fatty acid feed stock for dimerization and a method for preparing a fatty acid feed stock from a first source of fatty acids which are rich in oleic acids and from a second source of fatty acids which are rich in linoleic acids. In particular, the present invention is directed to blending from about 35 to about 45 percent by weight of crude red oil with from about 55 to about 65 percent by weight of soap stock derived from soy bean oil to provide a fatty acid feed stock.

6 Claims, No Drawings

FATTY ACID FEED STOCK BLEND OF RED OIL AND SOAP STOCK FOR THE PREPARATION OF DIMER FATTY ACIDS

The present invention relates generally to the manufacture of dimer fatty acids. More particularly, the present invention is directed to the provision of a suitable unsaturated fatty acid stock from which dimer acids may be manufactured, which stock may be effectively substituted for tall oil fatty acids.

The polymerization of fatty acids to provide dimer fatty acids is well known in the industry. The term "dimer fatty acids" or "dimer", as used herein, means the commercially available product which generally contains little monomer but contains trimer and higher polymers in amounts up to about 25 percent. Tall oil is a particularly desirable source of fatty acids which are to be dimerized to provide an intermediate product in chemical formulation. Tall oil is a natural mixture of resin acids and fatty acids which is obtained by acidifying the black liquor by-product of the alkaline paper pulp industry. Tall oil is obtained from the black liquor of the sulphate (Kraft) process of pulp manufacture, using resinous woods such as pine.

Tall oil fatty acids are separated from the resin acids and provide a unique blend of fatty acids, particularly suitable for the manufacture of dimers. The tall oil fatty acids are low in saturated acids and, of the unsaturated fatty acids, contain approximately equal amounts of oleic and linoleic fatty acids; but are free from linolenic fatty acids. The absence of linolenic acid results in a dimer product which has a particular desirable dimer to trimer ratio. Specifications for various end uses, such as the manufacture of polyamide resins, are based upon the dimer produced by polymerization of tall oil fatty acids.

Tall oil fatty acids, however, are in short supply from time to time and become expensive to use in the preparation of dimer. It would be desirable, therefore, to provide a fatty acid stock from more readily available sources which would provide a dimer having properties generally similar to the dimer produced from tall oil fatty acids.

Accordingly, it is a principal object of the present invention to provide a fatty acids stock from readily available sources of fatty acids which can be polymerized to produce a dimer having properties substantially similar to the dimer produced from tall oil fatty acids.

It is another object of the present invention to provide a method for the manufacture of fatty acid stock from a fatty acid source other than tall oil, which when dimerized, has properties substantially similar to those of dimers produced from tall oil fatty acids.

These and other objects of the present invention will become more apparent from the following detailed description.

Generally, in accordance with the present invention a feed stock for dimerization is prepared from a first source of fatty acids which are rich in oleic acid and from a second source of fatty acids which are rich in linoleic acid. It has been discovered that a readily available oleic acid source and a readily available linoleic acid source can be processed to provide a feed stock which can be polymerized to provide a dimer having properties substantially similar to the dimer produced by polymerization of tall oil fatty acids. In particular, the present invention is directed to processing from about 35 to about 45 percent by weight of crude red oil, which has from about 60 to about 80 percent by weight of oleic acid, with from about 55 to about 65 percent of soap stock derived from soy bean oil.

As used herein the term "crude red oil" defines a commercial product having a typical composition on a fatty acid basis as follows:

| Component | Percent |
|---|---|
| Palmitoleic | 3 - 7 |
| Oleic | 60 - 80 |
| Linoleic | 6 - 12 |
| Linolenic | 0 |
| Saturated fatty acids | 10 - 18 |
| Other fatty acids | trace - 2 |

The term "soap stock" refers to a fatty acid product derived from soy bean oil which has from about 50 to about 60 percent linoleic acid. Soap stock is commercially available and has a typical composition on a fatty acid basis as follows:

| Component | Percent |
|---|---|
| Oleic | 12 - 18 |
| Linoleic | 50 - 70 |
| Linolenic | 5 - 9 |
| Saturated fatty acids | 15 - 27 |
| Other fatty acids | trace - 2 |

While the indicated blend of crude red oil and soap stock of the present invention provides a feed stock having a desirable oleic acid to linoleic acid ratio, the blend contains an undesired level of saturated fatty acids. Also crude red oil and soap stock contain components other than fatty acids, such as color bodies, which are undesirable. Therefore, in the process of the present invention the crude red oil, the soap stock or the blend is desirably subjected to distillation to remove a portion of the saturated fatty acids. In this connection, the blend generally contains from about 13 to about 22 percent by weight saturated acid. Distillation removes from about 35 to about 85 percent by weight of the saturated fatty acids present in the blend. It has been found that a feed stock containing from about 4 to about 14 percent by weight of saturated fatty acids is suitable for the purpose of the present invention. It should be understood that distillation of either or both of the crude red oil and the soap stock can be effected prior to or after forming the blend. Also, polymerization of the feed stock can be effected without distillation of the blend or components and distillation can then be effected on the polymerized product.

The feed stock blend of the present invention prior to distillation of the blend of the components of the blend has the following fatty acid composition:

| Component | Unsaturated Bonds | Percent-Range |
|---|---|---|
| C10 | 0 | 0.2 - 0.8 |
| C12 | 0 | 0.5 - 1.5 |
| C14 | 0 | 1 - 2 |
| C15 | 0 | trace |
| C16 | 0 | 10 - 14 |
| C16 | 1 | 1 - 4 |
| C17 | 1 | .2 - .8 |
| C18 | 0 | 1 - 4 |
| C18 | 1 | 40 - 48 |
| C18 | 2 | 30 - 40 |
| C18 | 3 | 1 - 7 |
| C20 | 0 | trace |
| C22 | 0 | trace |

After distillation, the fatty acid feed stock of the present invention has a composition as follows:

| Component | Unsaturated Bonds | Percent-Range |
|---|---|---|
| C10 – C15 | 0 | trace |
| C16 | 0 | 2 – 7 |
| C16 | 1 | .5 – 2 |
| C17 | 1 | .2 – 1 |
| C18 | 0 | 1.5 – 4.5 |
| C18 | 1 | 40 – 52 |
| C18 | 2 | 20 – 40 |
| C18 | 3 | 2 – 7 |
| C20 and higher | | trace |

It is important to note that the fatty acid feed stock of the present invention has a significant level of linolenic acid. In this connection, tall oil fatty acids are unique in that they are free from linolenic acid. This has been thought to be one of the unique advantages of tall oil fatty acids for producing dimers. It is a significant discovery of the present invention that dimer fatty acids can be produced from a feed stock containing a significant level of linolenic acid in the range of 2 to 7 percent which are acceptable for use as a substitute for dimers produced from tall oil fatty acids free from linolenic acid. It is also significant to note that the feed stock of the present invention has a significant level of saturated fatty acids which are not present in tall oil fatty acids.

The feed stock of the present invention can be polymerized to produce a dimer by conventional procedures using a known clay catalyst. A natural montmorillonite clay mineral is preferred. It is preferred to use the clay mineral catalyst at a level of from 2 to 6 percent, preferably 4 percent. It is also preferred to use water in the reaction mixture at a level of from about 0.5 to about 4 percent by weight, preferably 1 to 2 percent. Reaction temperatures in the range of 425°–500° F can be used, with a preferred temperature being 470° F. The reaction pressure can be from 70–140 psig with a preferred pressure being 110 psig. The reaction time can be the range of 3 to 10 hours with a desired dimer being provided in about 4 to 6 hours.

The following example further illustrates various features of the present invention but is not intended to limit the scope o the invention which is defined in the appended claims.

EXAMPLE

A fatty acid feed stock for dimerization was prepared by combining 45 percent by weight of crude red oil with 55 percent by weight of a dried crude soya fatty acid soap stock. Sufficient crude red oil and soya fatty acids were used to provide 98 gallons. The crude red oil, the fatty acid soap stock, and their blend had the following compositions by weight.

| Component | Crude Red Oil | Soya Fatty Acid Soap Stock | Blend of Crude Red Oil and Soy Fatty Acid Soap Stock |
|---|---|---|---|
| Acid No. | 179.2 | 178.0 | 180.6 |
| IV | 85.7 | 125.6 | 110.4 |
| Saponification No. | 197.1 | 186.2 | — |
| Unsaps, % | 0.73 | 2.4 | — |
| C10 % | 0.1 | — | — |
| C12 | 0.2 | — | — |
| C14 | 2.5 | 0.1 | 1.3 |
| C15 | 0.3 | trace | — |
| C15:1 | — | — | — |
| C16 | 6.0 | 16.5 | 12.0 |
| C16:1 | 5.3 | — | 2.0 |
| C17:1 | 1.4 | — | — |
| C18 | 2.6 | 4.1 | 2.6 |
| C18:1 | 70.9 | 15.4 | 42.7 |
| C18:2 | 9.2 | 56.2 | 34.6 |
| C18:3 | — | 7.2 | 4.6 |
| C20 | 1.6 | 0.1 | — |
| C22 | — | 0.4 | — |

The above described blend was distilled to remove about 20 percent of the low boiling components as tops from the blend to provide a feed stock having the following compositions:

| Component | Level |
|---|---|
| C10 % | — |
| C12 | — |
| C14 | — |
| C15 | — |
| C15:1 | — |
| C16 | 5.1 |
| C16:1 | 1.1 |
| C17:1 | 0.6 |
| C18 | 3.7 |
| C18:1 | 47.9 |
| C18:2 | 36.8 |
| C18:3 | 4.6 |
| C (Unknown) | 0.3 |
| C20 | — |
| C22 | — |

The feed stock was combined with 4 percent by weight of clay and 2 percent by weight of water, and was charged into an autoclave. The mixture was heated to a temperature of 470° F and a pressure of 110 psig. The mixture was held at the temperature for 6 hours and was cooled and vented under a nitrogen purge to a temperature of about 200° F. About 0.7 percent by weight of 85 percent phosphoric acid was added and the mixture was agitated for 30 minutes. About 2 percent by weight of bleaching clay was then added, the mixture was agitated, and the contents were filtered to provide a dimer.

A tall oil fatty acid feed stock having 50 percent by weight oleic acid, 44 percent by weight linoleic acid, 0 percent linolenic acid, less than 2 percent saturated fatty acids, and 4 percent other fatty acids was polymerized in accordance with the above procedure. The properties of the polymerized product produced from tall oil fatty acids and from the product of the present invention are such that the products can be interchanged as chemical intermediates.

What is claimed is:

1. A fatty acid feed stock suitable for use in the preparation of dimer fatty acids having properties generally similar to dimer fatty acids produced from tall oil fatty acids, said feed stock comprising a distillation product derived from about 35 percent to about 45 percent by weight of crude red oil and from about 55 percent to about 65 percent by weight crude soya fatty acid soap stock, said feed stock having a composition of from about 0.5 to about 2 percent by weight of palmitoleic acid, from about 40 to about 52 percent by weight of oleic acid, from about 20 to about 40 percent by weight of linoleic acid, from about 2 to about 7 percent by weight of linolenic acid and from about 3.5 to about 11.5 percent by weight of saturated fatty acids.

2. A fatty acid feed stock in accordance with claim 1 wherein said crude red oil has a composition on a fatty acid basis of 3 to 7 percent by weight of palmitoleic acid, 60 to 80 percent by weight of oleic acid, 6 to 12 percent by weight of linoleic acid, 10 to 18 percent by weight of saturated fatty acids and a trace to 2 percent by weight of other fatty acids.

3. A fatty acid feed stock in accordance with claim 1 wherein said soap stock has a composition on a fatty acid basis of from about 12 to about 18 percent by weight oleic acid, from about 50 to about 70 percent by weight of linoleic acid, from about 5 to about 9 percent by weight of linolenic acid, from about 15 to about 27 percent by weight of saturated fatty acids, and from a trace to about 2 percent of other fatty acids.

4. A method for providing a fatty acid feed stock suitable for use in the preparation of dimer fatty acids having properties generally similar to dimer fatty acids produced from tall oil fatty acids, said method comprising providing a blend of from about 35 percent to about 45 percent by weight of crude red oil and from about 55 percent to about 65 percent by weight crude soya fatty soap stock, and distilling said blend of said crude red oil or said soap stock to provide a fatty acid feed stock having a composition of from about 0.5 to about 2 percent by weight of palmitoleic acid, from about 40 to about 52 percent by weight of oleic acid, from about 20 to about 40 percent by weight of linoleic acid, from about 2 to about 7 percent by weight linolenic acid and from about 3.5 to about 11.5 percent by weight of saturated fatty acids.

5. A method in accordance with claim 4 wherein said crude red oil has a composition on a fatty acid basis of 3 to 7 percent by weight of palmitoleic acid, 60 to 80 percent by weight of oleic acid, 6 to 12 percent by weight of linoleic acid, 10 to 18 percent by weight of saturated fatty acids and a trace to 2 percent by weight of other fatty acids.

6. A method in accordance with claim 4 wherein said soap stock has a composition on a fatty acid basis of from about 12 to about 18 percent by weight oleic acid, from about 50 to about 70 percent by weight of linoleic acid, from about 5 to about 9 percent by weight of linolenic acid, from about 15 to about 27 percent by weight of saturated fatty acids, and from a trace to about 2 percent of other fatty acids.

* * * * *